Sept. 1, 1959  H. LÜHR  2,902,113
MULTI-CHAMBER DUST FILTER PLANT
Filed June 14, 1954  3 Sheets-Sheet 1
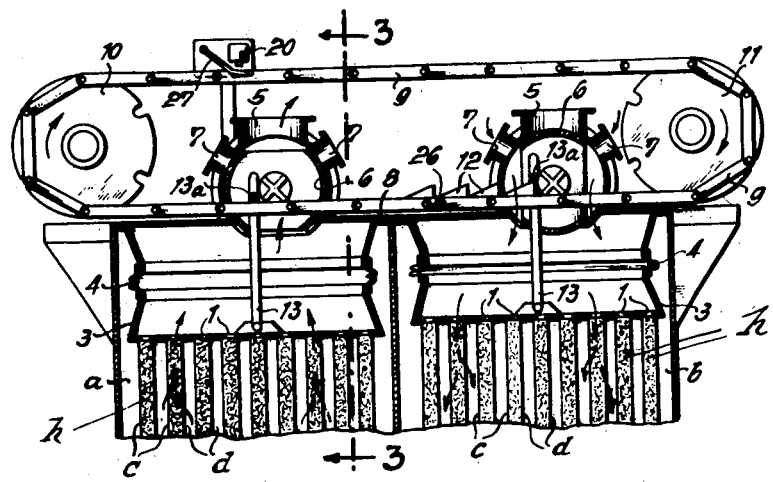
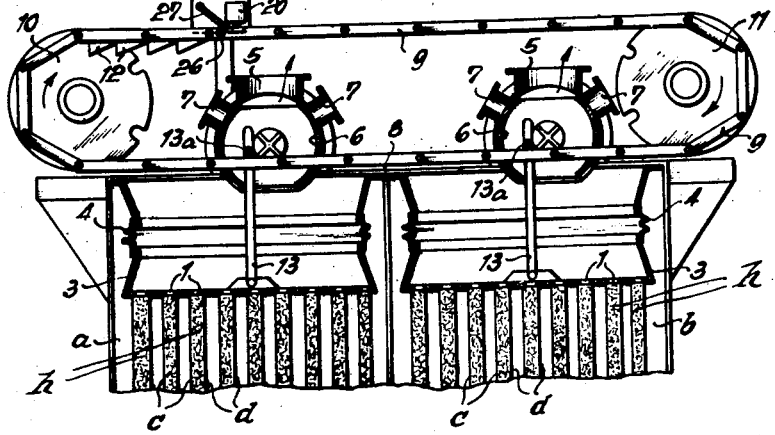
INVENTOR
HEINRICH LÜHR

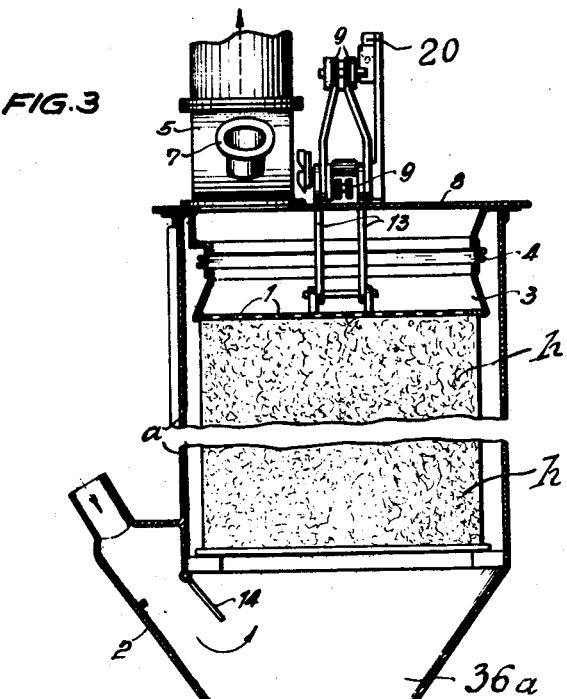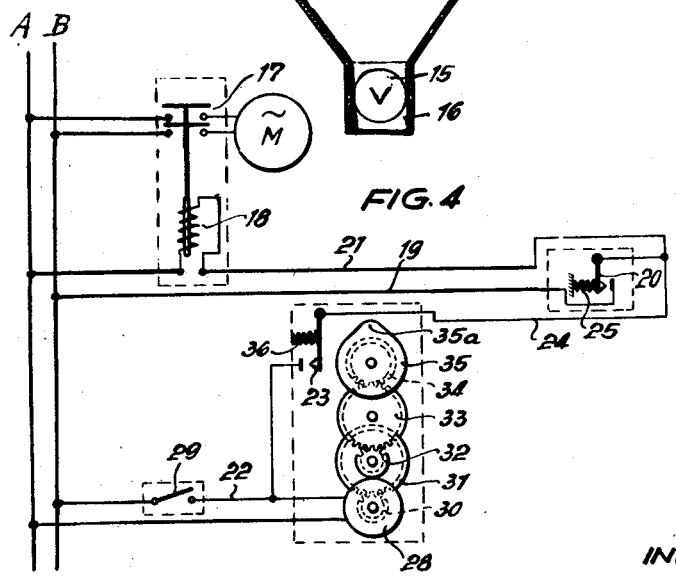

United States Patent Office 2,902,113
Patented Sept. 1, 1959

2,902,113

MULTI-CHAMBER DUST FILTER PLANT

Heinrich Lühr, Hannover, Germany

Application June 14, 1954, Serial No. 436,604

Claims priority, application Germany June 18, 1953

1 Claim. (Cl. 183—54)

The present invention relates to dust filter plants or apparatus, and is particularly directed to multi-chamber dust filter plants in which the filtering means of the individual filter chambers are periodically subjected to cleaning treatment, whereby the dust is removed from the filtering hoses or flat filtering sheets through lifting and subsequent dropping of the filtering means, and whereby the thus loosened dust is then carried off by scavenging air traversing the filtering means in counter-current to the current of dust-laden air, and then conveyed either mechanically or pneumatically to a collecting tank or the like for the dust. This cleaning treatment of the filtering means is successively applied to all of the filter chambers and starts again at the first filter chamber as soon as the cleaning of the filtering means of the last filter chamber has been completed.

Experience has taught that in some cases the dust to be removed is of an especially dry kind, particularly in so-called hot-gas-filters, through which hot dust-laden gas is guided for filtering at temperatures of above 100 degrees centigrade. The dust adhering to the filtering means is practically over-dried then and can be easily shaken off the filtering means, so that cleaning of the filtering means through shaking or rocking in cooperation with the cleaning by means of scavenging air is necessary only at considerable intervals of time.

The invention essentially resides in the provision of multi-chamber dust filter plants, operating with dust removing shaking or rocking means, with two control elements of which one mechanically disconnects the driving motor of the shaking or rocking means through the movement of the latter as soon as the cleaning of the filtering means of all of the filter chambers has been accomplished, until the second control element after a time-controlled interval reestablishes for a short period the connection of the driving motor. This operational cycle is repeated during the operation of the dust filter plant.

It will be seen, therefore, that according to the invention the filtering means of all of the filter chambers are successively cleaned through shaking or rocking, whereupon the shaking and rocking means are arrested for a predetermined period of time whose length depends upon the degree of dryness of the dust to be removed. A procedure like this prolongs considerably the lifetime of the filtering material which at the aforesaid temperatures is exposed to considerable wear, unless a filtering material such as glass wool packings, glass wool tissues or the like are used which endure high temperatures, but which when subjected to frequent shaking and rocking will sooner or later break, and then have to be exchanged. The present invention particularly applies to heat resisting filtering material of the last mentioned type where it constitutes a valuable improvement, as it prolongs the lifetime of the filtering material very considerably and thereby avoids the frequent exchange of the material. A further advantage resides in the savings made through the reduction in current consumption for the actuation of the shaking or rocking means, which savings will be still further augmented if the ventilator for the supply of scavenging air is likewise disconnected during the standstill of the shaking or rocking means.

The invention will be best understood from a consideration of the following detailed description taken in connection with the accompanying drawings, forming a part of this specification and in which an embodiment of the invention has been shown by way of illustration. However, the invention is not confined to any strict conformity with the showing of the drawings, but may be changed or modified, so long as such changes or modifications mark no material departure from the salient features of the invention as expressed in the appended claim.

In the drawings, in which like parts are referred to by the same reference characters.

Fig. 1 is a vertical longitudinal section through the upper portion of the filter plant provided with a rotating endless rocker chain;

Fig. 2 is a vertical longitudinal section similar to that of Fig. 1 with the rocker chain disconnected from its actuating means;

Fig. 3 is a vertical sectional view taken substantially along line 3—3 of a filter chamber and its dust connecting compartment;

Fig. 4 is a wiring plan for the connection and disconnection of the driving motor of the rocker chain;

Figure 5:
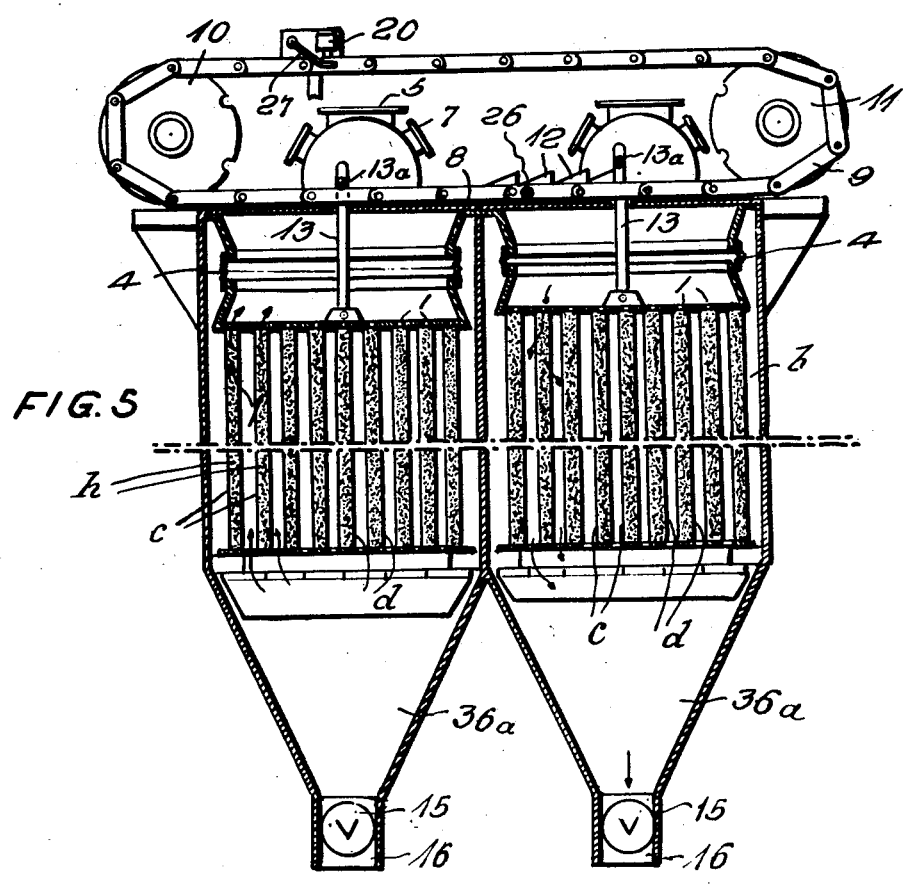
Fig. 5 is an exploded sectional view similar to Fig. 1 but illustrating additional structure forming a part of the invention.
Figure 6:
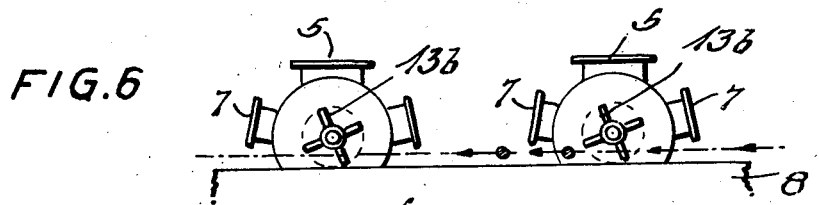
Fig. 6 is a fragmentary side elevational view illustrating certain valve structures forming a part of the invention.
Figure 7:
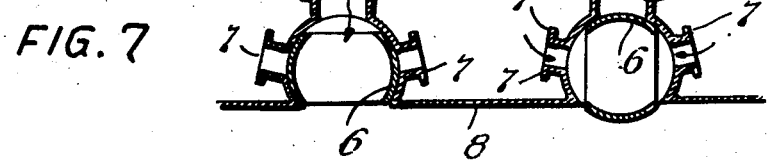
Fig. 7 is a longitudinal sectional view of Fig. 6.

Multi-chamber dust filter plants are usually so devised that the filter chambers are arranged in consecutive rows, or that two rows of chambers are arranged parallel beside each other. It is further possible to combine a plurality of filter chambers into a set of, for instance, four chambers, and to arrange them in such a way that they form a square. If the filter chambers are arranged in a row one behind another, or in a plurality of rows parallel to each other, the invention employs, for shaking the dust off the filtering means, endless rotating chains provided with tooth-like lifting members for the lifting and dropping of the filtering means, while, when the filter chambers form squares, the tooth-like lifting members are arranged on rotating discs.

The simplified embodiment illustrated in the drawings shows a filter plant or apparatus provided with only two filter chambers $a$ and $b$ arranged one next to the other. Suspended in each of these filter chambers is a plurality of filtering hoses, or (as shown in the drawings) a plurality of flat filtering members $c$, $d$. In the latter case, always two flat filtering members $c$, $d$ form the filtering element, and a plurality of these filtering elements then form the filtering set. The filtering members or filtering sheets $c$ and $d$ of every filtering element are arranged in a frame in such a way that between them a hollow chamber is formed which is closed at its lower end and which at its upper end is provided with a passage opening 1. These hollow chambers are filled with loose filter material, as indicated at $h$. The hollow spaces between the individual filtering elements are closed at the top and open at their lower ends, so that the dust-laden air can pass from a distributing channel 2 (see Fig. 3) into a compartment 36a beneath each of the filter chambers $a$ and $b$, and from there via the lower openings in the hollow spaces between the filtering elements, through the filtering sheets $c$ and $d$, the passage openings 1, the hood 3, and the flexible connection 4 into the branch pipe 5, where it arrives in purified condition. Connected with the purified air branch 5 is a suction fan (not illustrated in the drawings) which sucks the dusty air through the filter chambers. In the purified air branch pipes 5 are arranged rotary slide valves 6 (of cylindrical formation) or throttle valves (not shown), and connected to the branch pipes 5 are one or two further branch pipes 7 connecting the branch pipes 5 with a fresh air ventilator (not illustrated in the drawings) by means of which a counter-current of scavenging air can be forced through the filtering material in a direction opposite to that of the dusty air. Thus separate dust-laden air currents are filtered through chambers a and b and separate scavenging air currents are recirculated therethrough.

An endless chain 9 is mounted on the top wall 8 of the filter chambers a and b which travels around two guide wheels 10 and 11 of which, in the embodiment illustrated in the drawings, the wheel 10 is rotated at slow speed by an electromotor M (shown only in the wiring plan of Fig. 4). A plurality of lifting members 12 of tooth-like formation is arranged successively on a plurality of chain links by means of which the sets of filtering elements c, d are lifted up and then caused to drop during the cleaning periods. For this purpose each filtering set of each filter chamber is provided with a bail 13, embracing the lower portion of the chain 9. Each bail 13 has a cross-bar 13a. The chain 9 is provided with a plurality of tooth-like lifting members 12 whose lifting surfaces are brought to bear against the cross-bars 13a during the rotation of the chain, so that the bail 13 and the filtering set connected thereto are periodically and automatically lifted up and then, at the end of the ascending lifting surface, automatically caused to drop.

The filter plant provided with the aforedescribed shaking or rocking means operates as follows:

By means of the suction fan connected with the branch pipe 5 dust-laden air is sucked via each of the distributing channels 2 (see Fig. 3) into the filter chambers a and b, whereby, because of existing pressure conditions, the respective flap values 14 automatically open, while the respective flap values 15 automatically close. During this sucking-in action the rotary slide valves 6 are rotated into the position illustrated in Fig. 2 at the left side of Fig. 1, so that the sucked-in dust-laden air is caused to pass through the filtering sheets, c, d and is automatically purified by the latter, and then guided in purified condition via the branch pipe 5 and the suction ventilator to desired places. While this is going on, the endless chain 9 rotates in the direction indicated by the arrows (see Fig. 1). Whenever the lifting teeth 12 reach the supporting bail 13 of the filter chamber b, the rotary slide valve 6 is rotated into the position shown on the right hand side of Fig. 1 wherein it will be seen that the pipe 5 is entirely closed by the valve 6 but that the valve 6 does not entirely close the passage of air from the pipes 7 into the hood 3. This rotation may be effected by a catch provided on the endless chain 9 (not shown), the catch cooperating with a spider 13b. With the rotary slide valve 6 in this position, the scavenging air providing means such as blowers (not shown) to force scavenging air via the branch pipes 7 into the chamber b, so that a counter current of scavenging air is forced through the filtering material c, d in a direction opposite to the current of dusty air. The blowers may operate continuously or, in order to save power, may be shut off by switch means (not shown) which are triggered by the slide valves 6. Simultaneously, the entire filter set is several times lifted up and then caused to drop by the teeth 12, so that the dust adhering to the filtering material is knocked off. The knocked-off dust as well as the scavenging air are then removed via the branch pipe 16, whereby the air pressure building up in the lower dust connecting compartment automatically closes the pressure sensitive valve or flap valve 14 illustrated schematically in Fig. 3 and simultaneously opens up the pressure sensitive valve or flap valve 15 of the respective compartment 36a also illustrated schematically in Fig. 3. The dust can then mechanically or pneumatically be conveyed to a desired place. As soon as all of the teeth 12 have passed underneath the bail 13, the rotary slide valve 6 moves back into the position shown at the left hand side of Fig. 1, so that the cleaned chamber b is now again opened up for the passage of dusty air, whereby the flap valve 14 automatically opens up due to drop of pressure in the corresponding chamber 36a, while the flap valve 15 automatically closes for the same reason. The operation as described above is similarly repeated with respect to chamber a and the other chamber 36 and this operational cycle is continuously repeated during the running of the device.

Driving and rocking arrangements of the aforedescribed type and other types are already known to the art. In practically every one of these known constructions the rocking means are rotated at low speed by an electromotor with the aid of either an endless chain or a rotating disc, whereby the filtering material of the different chambers is periodically successively rocked and simultaneously traversed by a current of scavenging air.

The control means for the driving motor of the rocking mechanism as disclosed in the present invention are particularly intended for use in such cases where the dust to be removed by the filter plant is of an extremely dry kind, and for that reason adheres to the filtering material just loosely. The control means are, therefore, especially suited for multi-chamber dust filter plants in which the dust-laden gas or air traverses the filtering material at temperatures above 100 degrees centigrade, so that the dust to be removed is practically over-dried.

The control means for the driving motor of the rocking mechanism will now be described with the aid of the wiring plan illustrated in Fig. 4.

The driving motor M, which rotates the shaft of the guide wheel 10 of the endless rocker chain 9 at low speed, is connected via a relay switch 17 with power lines A and B. The relay switch 17 is coupled to a relay 18 which is positioned in two parallel circuits. One of the circuits consists of the conductor 19, power line B, a switch 20 and the conductor 21 which via the relay 18 is connected to the power line A. The second one of the parallel circuits consists of the power line B, a conductor 22, a switch 23, the conductor 24 and the conductor 21 which again via the relay 18 leads to the power line A.

The switch 20 of the circuit 18, 19, 20, 21 is so devised that it is maintained in closed contact position by the pressure spring 25. The switch 20 cooperates with a switch-pin 26 mounted on the rotating chain 9 (see Figs. 1 to 3) in such a way that the pin 26 displaces the pivotable lever 27 of switch 20, which thereupon opens the switch 20 against the resistance of the pressure spring 25, after the filtering means of all of the filter chambers a, b have successively been rocked and cleaned. The relay 18 is now disconnected from the power source, the contacts of the relay switch 17 due to the deenergizing of relay 18 open up, and the motor M, serving as driving means for the rocking device 9, 12 is thus electrically disconnected and brought to a standstill. The duration of the inactivity of the driving motor M is determined by the timed actuation of a control element. This control element may for example consist of a small electric motor 28 which may be connected with the network via a master switch 29 and which causes via a reducing gear 30 to 34 a cam 35 to rotate at very low speed. Let us suppose that the motor M is not working, which means that the switch 20 as well as the relay switch 17 are open (see also Fig. 2), then the cam 35 actuated by the synchronous motor 28 continues to rotate until the lobe 35a of the cam closes the switch 23 which normally is maintained by the pressure spring 36 in opened condition. The closing time of the switch 23 by means of the lobe 35a can be regulated through corresponding formation of the lobe and is a comparatively short one. Closing of the switch 23 energizes the relay 18 in the circuit 22, 23, 24, 21 and thereby causes the relay switch 17 to move into contact position, with the result that the motor M for the actuation of the guide wheel 10 results in rotation of the rocker chain 9, so that the switch pin 26 of this chain, which previously opened the switch 20, leaves the range of the lever 27 with the result that the lever 27 swings back in downward direction and thereby enables the switch 20 to yield to the pressure of its spring 25 and to move back into contact position. As soon as electrical contact has been established, the switch 23 reopens (because of corresponding formation of the lobe 35a), so that the driving motor M can continue to rotate until all of the filtering material of all of the filter chambers has successively been rocked and cleaned and until the switch pin 26 of the rocker chain 9 reopens the switch 20.

It is understood that the ratio of the time required for the actuation of the rocker means to the time in which the motor M is idle can be adjusted according to requirements through corresponding selection of the reducing gear 30 to 34 of the electric motor 28 for the actuation of the cam 35. The construction disclosed in the present invention, therefore, makes it possible to restart the rocker mechanism after any required period of rest, whereby the length of the required period of rest depends upon the condition, that is to say, the degree of dryness of the dust to be separated from the gas. It is further feasible to devise the construction in such a way that the chain 9 also cooperates with another switch pin by means of which it is possible to also disconnect the motor of the scavenging air supply means during this period of rest of the rocker means.

What I claim as new and desire to secure by Letters Patent of the United States is:

A multi-chamber filter plant for hot dust-laden gas comprising a frame provided with a top wall having an opening therein, a horizontally extending endless chain mounted on said top wall, a series of lifting teeth affixed to the inner face of said chain, bail means extending through the opening in said top wall and encompassing the lower flight of said chain in the path of movement of said teeth, a plurality of individual filter chambers provided with filter means supported by said bail means below said top wall, a first electric motor for driving said chain whereby to successively bring said teeth into contact with said bail to lift and drop the same thereby successively shaking said filter chambers, a source of electrical energy, a circuit interconnecting said source and said first motor, first switch means for controlling said circuit and accordingly the actuation of said first motor, a pin on said chain for operatively engaging said first switch means upon driving of said chain to the extent where all of said teeth have engaged said bail, engagement of said pin acting to open said first switch means to deenergize said first motor, a second electrical motor, timing means driven by said second motor, a cam driven by said timing means, a second switch normally open and periodically closed by said cam, and means operable by the closing of said second switch for closing the circuit to said first motor to thereby initiate a further cycle thereof.

References Cited in the file of this patent
UNITED STATES PATENTS

| | | |
|---|---|---|
| 1,336,600 | Tuttle | Apr. 13, 1920 |
| 2,047,908 | Newhouse et al. | July 14, 1936 |
| 2,318,395 | Hornbrook | May 4, 1943 |
| 2,534,600 | Hutchings | Dec. 19, 1950 |
| 2,633,206 | Bruckner | Mar. 31, 1953 |

FOREIGN PATENTS

| | | |
|---|---|---|
| 368,731 | Great Britain | Mar. 1, 1932 |
| 606,956 | Germany | Dec. 14, 1934 |